United States Patent [19]

Anghinoni di Luigi

[11] 4,217,842
[45] Aug. 19, 1980

[54] ROLLER FEED DEVICE FOR SEWING MACHINES

[75] Inventor: Ottorino Anghinoni di Luigi, Corsico, Italy

[73] Assignee: Rockwell-Rimoldi S.p.A., Milan, Italy

[21] Appl. No.: 1,116

[22] Filed: Jan. 5, 1979

[30] Foreign Application Priority Data

Jan. 20, 1978 [IT] Italy ................................ 19455 A/78

[51] Int. Cl.² .......................................... D05B 27/14
[52] U.S. Cl. .................................. 112/322; 192/12 B
[58] Field of Search ........... 112/322, 318, 303, 121.26, 112/132, 305; 192/12 R, 12 B

[56] References Cited

U.S. PATENT DOCUMENTS

| 2,325,643 | 8/1943 | Weis | 112/322 |
| 2,461,862 | 2/1949 | Weis | 112/322 |
| 2,901,991 | 9/1959 | Reimer | 112/322 X |
| 3,221,688 | 12/1965 | Marjorio | 112/322 X |
| 4,102,282 | 7/1978 | Hsiao et al. | 112/121.26 |

*Primary Examiner*—H. Hampton Hunter

[57] ABSTRACT

An improved feed device for sewing machines of the double feed roller type in which one of the rollers is intermittently rotated by a unidirectional clutch. A clamping unit functions in cooperation with the clutch to prevent a reverse movement of the feed roller, and a braking device operatively associated with the clutch and clamping unit is effective in a simultaneous positive locking of both of the latter each time the feed roller completes its limit of travel.

6 Claims, 4 Drawing Figures

ROLLER FEED DEVICE FOR SEWING MACHINES

BACKGROUND OF THE INVENTION

The present invention pertains to an improved roller type feed device for sewing machines.

As is well known, such feed devices consist essentially of a pair of contiguous rollers with one thereof being rotatably driven. A work piece is advanced between the rollers by means of an intermittently driven unidirectional clutch having a braking unit operatively associated therewith.

As is well known, an intermittently driven unidirectional clutch is adapted to transform a pivotal movement generated by an eccentrically driven connecting rod mechanism into a unidirectional intermittent rotational movement. The braking unit serves to stop rotation of the drive feed roller after it has been caused to rotate a predetermined distance effected by the connecting rod mechanism to which it is operatively connected.

Additionally, the known types of intermittently driven clutches generally include a driving or actuating mechanism and a clamping unit with the latter serving to prevent rotation of the feed roller in a direction opposite that for effecting advance of a workpiece.

Usually, in such types of roller feed devices, the unidirectional clutch is located within one of the two rollers.

As is well known, sewing machines are required to operate at what is considered high speed and the frequency of oscillations transmitted to the feed wheel by the eccentrically driven connecting rod mechanism are of sufficient number so as to cause inadequate braking by the braking unit operatively associated therewith. As described above these braking units are intended to prevent over-travel of the drive feed roller during the performance of its intended function.

Additionally, the known forms of braking units are of the type in which the braking elements are engaged during the actual actuation of the feed roller causing a dissipation in heat of a portion of their effective braking force. Such braking units are not considered economical, reliable or efficient for they are subject to what is considered premature wear of the braking elements as well as frequent adjustments thereto in order to maintain effective braking.

With the feed roller capable of being incrementally advanced at selected rotational velocities, the limited size of the braking unit which the device can accommodate presents another disadvantage for it is obvious that the braking force should be increased with an increase in velocity of said feed roller.

SUMMARY OF THE INVENTION

The present invention has corrected the above disadvantages by means of an improved drive for the feed roller having a braking unit operatively associated therewith which is caused to be activated immediately upon completion of advance of the workpiece by said feed roller.

The device according to the invention utilizes a roller feed device of the type described with a braking unit connected thereto that is disposed intermediate the drive unit and the clamping unit.

The brake unit is caused to rotate with the drive unit and is adapted to simultaneously lock the feed roller and clamping unit upon completion of each incremental movement of said feed roller.

An important advantage of the invention is that the braking unit is activated only when the feed roller completes each incremental advance of a workpiece which is effective in a positive cessation of rotation so that the stitching cycle can be completed with the workpiece securely held.

These and other advantages of the present invention will become more fully apparent by reference to the appended claims and as the following detailed description proceeds in reference to the figures of drawings wherein:

DESCRIPTION OF THE PREFERRED EMBODIMENT

The roller feed device of the present invention is adapted for use on sewing machines as an auxiliary device for the main feed dog (not shown) and is spaced from the latter in alignment with the direction of advance of a workpiece by said feed dog. The device is capable of accommodating a workpiece of heavy material or one which may have protruding elements such as cross-stitching, loops for belts, etc.

Figure 1:
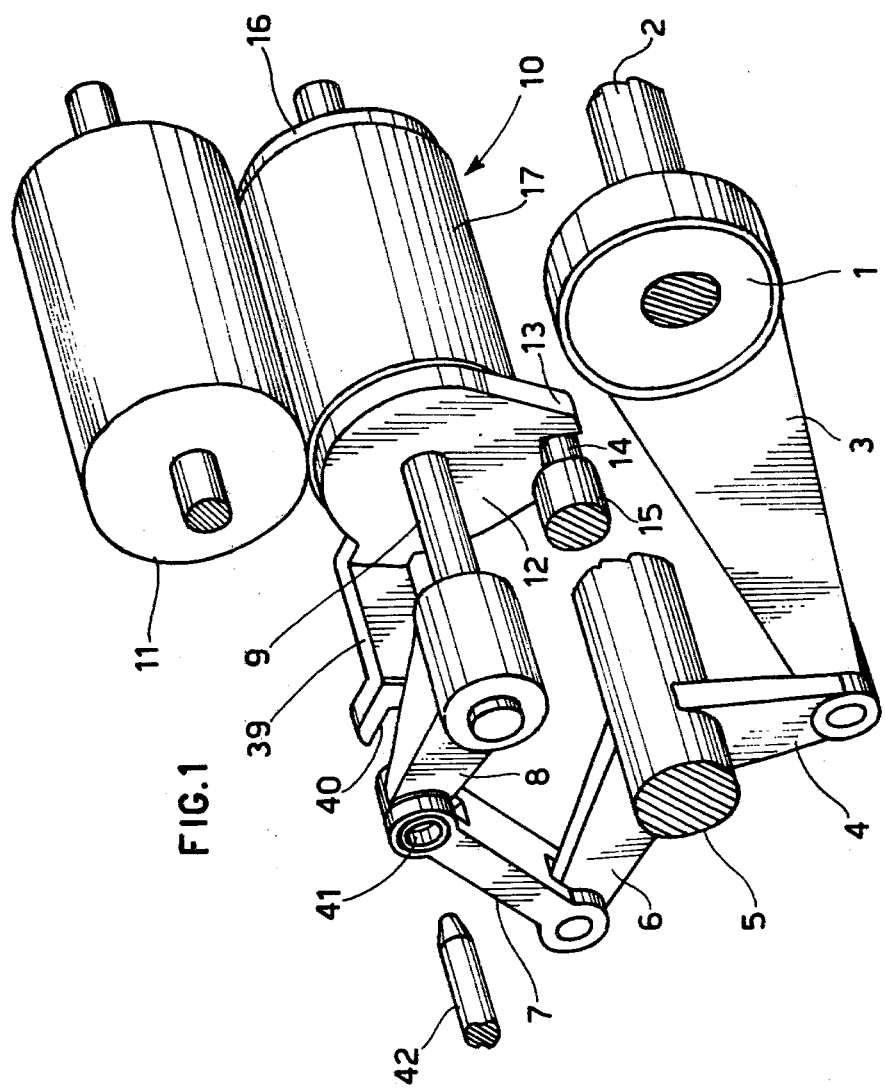
FIG. 1 is a perspective view of the device according to the invention showing the drive unit for effecting incremental rotation of the feed roller.

Referring now to FIG. 1, the roller feed device comprising the invention is usually driven by and interconnected with the sewing machine's source of driving power. The means for driving the roller feed device includes an eccentric 1 which is adjustably mounted on one end of the machine's main shaft 2. A lever 3 interconnects the eccentric 1 with an arm 4 which is fixed on and extends from a conventional feed shaft 5.

The feed shaft 5 includes another arm 6 extending therefrom which by means of a link member 7 is operatively connected to an arm 8 that is fixed on a control shaft 9 of a conventional type unidirectional clutch.

This unidirectional clutch is located within a drive feed roller identified generally by numeral 10 which is disposed in contiguous relation with a cooperating feed roller 11.

Specifically, the drive feed roller 10 is supported in a conventional manner from within the base of the sewing machine (not shown), and the feed roller 11 is supported in a similar manner by a movable structure (not shown) connected to the exterior surface of the machine.

Figure 2:
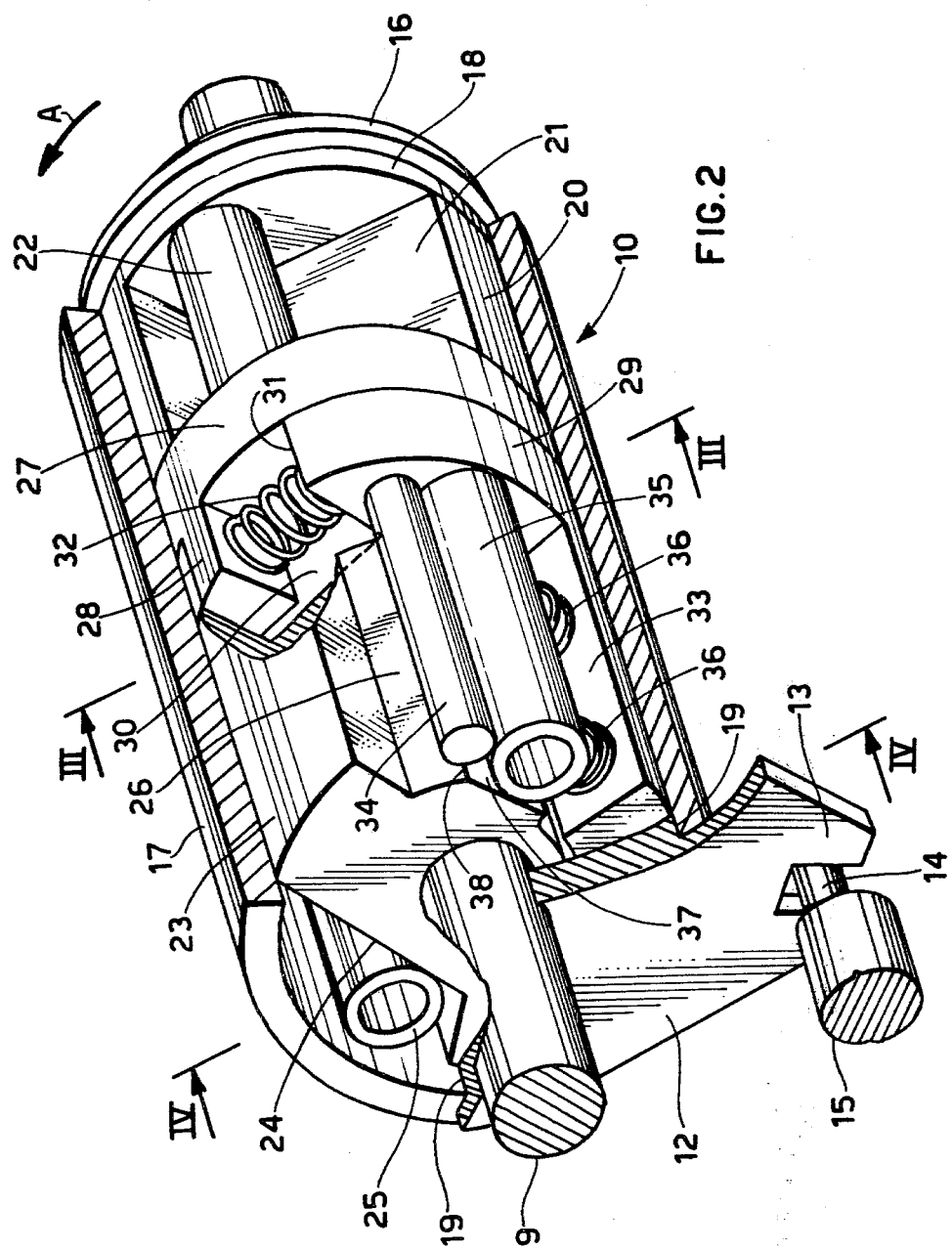
FIG. 2 is a perspective view and partially in section showing further detail of the driven feed roller.

Referring now to FIG. 2, the unidirectional clutch includes a cover plate 12 having a lower bifurcated end 13 within which an eccentric pin 14, forming one end of a shaft 15, is disposed. Shaft 15 is rotatably supported by any suitable means to the frame of the machine (not shown) and extends parallel to the control shaft 9.

A second cover plate 16 is assembled on the oposite end of the drive feed roller 10 and serves to enclose the elements of the unidirectional clutch yet to be described. Both of the cover plates 12 and 16 include integral and circular guide surfaces 19 and 18 respectively (FIG. 2) which assemble within the ends of the drive feed roller's cylindrical casing 17 and serve to guide the latter as it is incrementally rotated.

Figure 3:
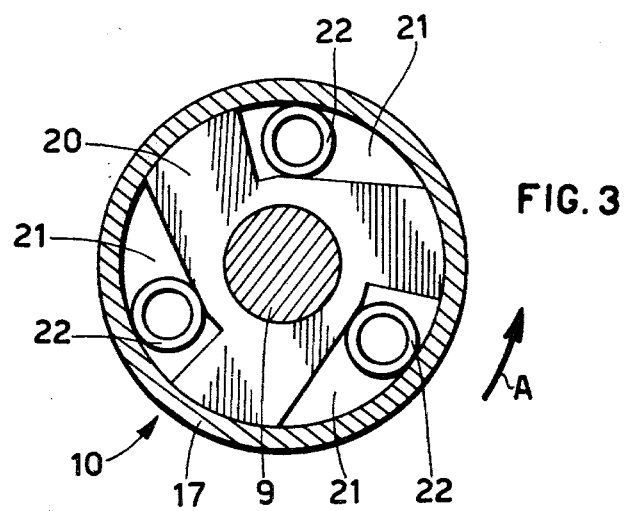
FIG. 3 is a sectional view of the feed roller taken along line III—III in FIG. 2; and, FIG. 4 is a sectional view of the feed roller taken along line IV—IV in FIG. 2.

With reference to FIG. 3 the unidirectional clutch includes a drive sector 20 rotatably mounted on the control shaft 9. This drive sector 20 is provided with a plurality of peripheral slots 21 within each of which a clutch roller 22 is disposed. These peripheral slots 21, as is well known, have a tapered section which during rotation of the drive sector 20 in the direction of the arrow A (FIG. 2) will cause the clutch rollers 22 to become wedged between said drive sector and the cylindrical casing 17 in such a way that they will rotate as one.

Figure 4:
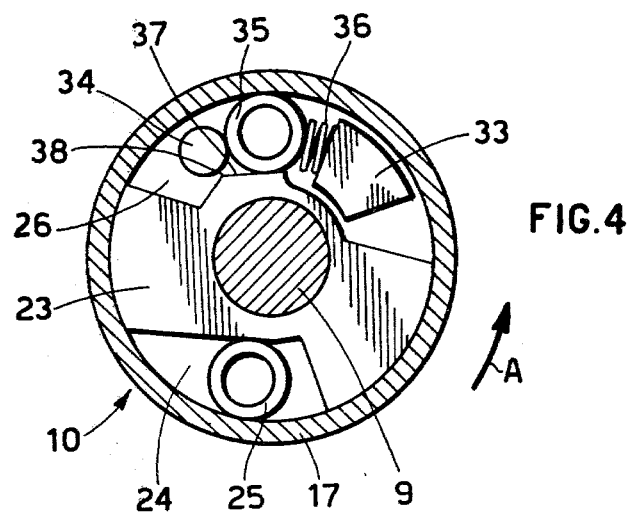

With regard to FIG. 4, the unidirectional clutch is also provided with a conventional clamping unit mounted coaxial with the drive unit, and includes a clamping sector 23 rotatably mounted on the control shaft 9. This clamping sector 23 is connected in a conventional manner, not shown, to the cover plate 12 and also includes at least one peripheral slot 24.

The peripheral slot 24 has a clutch roller 25 located therein and includes a tapered section, oriented in the same direction as the peripheral slots 21 in the drive sector 20 which effects a wedging of the clutch roller 25 so as to prevent rotation of the drive feed roller 10 in the direction opposite that of the feed of the workpiece during the return of the drive sector 20 to its starting position.

The clamping sector 23 also includes a peripheral slot 26 having a configuration which is adapted to receive a portion of the brake unit elements therein now to be described.

The braking unit according to the invention includes a first disc 27 (FIG. 2) that is rotatably mounted on the control shaft 9 and is operatively connected to the drive section 20. This first disc 27 has an integral extension 28 that is spaced radially from the control shaft 9 and extends in the direction of the clamping sector 23.

As shown in FIG. 2 a second disc 29 is provided which is connected to the control shaft 9 and includes a radial groove 30 within which the extension 28 of the first disc 27 extends.

The second disc 29 includes a radial wall 31 that faces in the direction of drive and interposed between said wall and the extension 28 a flexible coupling is provided which defines a helical spring 32.

Additionally, the second disc 29 includes a thrust member defined by an extension 33 which extends between the slot 26 of the clamping sector 23 and a return element in the form of a rod 34 which is disposed parallel to and spaced from said extension 33. A clutch roller 35 is located within the space between the extension 33 and rod 34 and is continuously urged into contact with the latter by means of a pair of coil springs 36 interposed between it and said extension 33.

As shown in FIG. 4, the slot 26 of the clamping sector 23 within which the extension 33, clutch roller 35 and rod 34 are located includes a generally flat or planar surface 37 radially spaced from the control shaft 9 and disposed so as to extend parallel therewith.

The surface 37 cooperates with the inner surface of the cylindrical casing 17 to form a section of the slot 26 which is tapered toward the direction of rotation of the clamping sector 23. This section extends the full longitudinal length of the slot 26, which is of uniform shape and has an edge identified by numeral 38 which provides a wedging position for the clutch roller 35 against the inner cylindrical surface of the casing 17 and with adequate clearance for the rod 34.

The edge 38 defines the limit of the rotary movement of the drive sector 20.

The wedging position formed by the edge 38 is operatively connected to a control mechanism having a forked extension 39 (FIG. 1) formed integral with the cover plate 12 which includes a groove 40 disposed adjacent to one end of the control arm 8. A pin 42 operatively interconnects the groove 40 of the forked extension 39 with the link member 7 and arm 8 which include a hole 41 for receiving said pin.

To summarize the operation, each complete rotation of the eccentric 1 causes a full oscillation of the control arm 8 which in turn effects the required amount of rotational movement of the control shaft 9 in both directions.

During rotation of the control shaft 9 in the direction of the indicating arrow A, the second disc 29 exerts a force on the extension 28 by means of the helical spring 32 so as to control the limit of travel of the drive sector 20.

During this phase the clutch rollers 22 are wedged against the inner surface of the cylindrical casing 17 causing it to rotate. At the same time, the second disc 29 causes the clutch roller numbered 35 also to move by means of the extension 33.

In moving, the clutch roller 35 travels across the flat surface 37 until it reaches the wedging and braking position 38 which corresponds to the end of the feed advance and is effective in stopping the drive feed roller 10 and the workpiece.

Specifically, in order to ensure synchronization of movement and the precise stopping desired of the cylindrical casing 17, the limit of movement of the control shaft 9 and of the second disc 29 is arranged to be slightly greater than the distance the clutch roller must travel to the braking position 38. More specifically, the difference in angle between the end of travel of the second disc and the wedge position 38 of the clutch roller 35 is approximately 1°.

To accomplish the necessary wedging of the clutch roller 35 and to be certain that said clutch roller remains in its wedged position for a sufficient length of time to ensure stopping of the cylindrical feed roller 10, the above-mentioned difference in the amount of movement is completely absorbed by the helical spring 32.

The cylindrical feed roller 10, independently of the inertia accumulated during its rotation, is stopped even if the second disc 29 has not completed its limit of travel.

To complete each oscillation, the second disc 29 moves in a direction opposite the direction of rotation of the control shaft 9 by means of rod 34 which is effective in cancellation of the wedged condition of the clutch roller 35 by pushing it in the direction opposite to that indicated by the arrow A.

During this phase the drive feed roller 10 is motionless due to the wedging of the roller 25 of the clamping sector 23 with the cylindrical casing 17.

Occasionally there is need to vary the extent of feed of a workpiece and it then becomes necessary to re-establish the optimum intervention conditions for the braking unit insofar as the above-mentioned variation results in a different amplitude of oscillation of the control arm 8.

However, in order to restore the optimum difference in angular movement of the second disc 29 of the clutch roller 35, it is necessary that the main shaft 2 be rotated manually so as to locate the control arm 8 in the dead center position of its limit of travel. After doing this, the control shaft 15 must be rotated, first in one direction and then in the other, so as to cause the groove 40 of the extension 39 to align with the hole 41 of the control arm 8. This adjustment is facilitated by the pin 42 which must slide into both the hole 41 and the groove 40.

Because the extension 39 is located on the cover plate 12 in a predetermined position so as to ensure the above-mentioned optimal difference, when the groove 40 is aligned with the hole 41, the edge 38 is then in the desired position with regard to the dead center of the limit of travel of the second disc 29.

I claim:

1. An improved roller feed device for sewing machines having a pair of contiguously disposed feed rollers with an intermittent unidirectional clutch mounted within one of the rollers for effecting incremental advance of a workpiece between the rollers, said roller feed device comprising:
   (a) an oscillatably driven control shaft (9);
   (b) a drive unit (20,22) rotatably mounted on said control shaft (9) within a cylindrical casing (17) defining one of the feed rollers for rotating the latter a distance corresponding to the limit of advance of the workpiece;
   (c) means defining a clamping unit (23,25) assembled on said control shaft (9) and operatively connected to said drive unit for preventing movement of said cylindrical casing (17) reverse that of its direction of feed; and
   (d) a braking unit connected to and disposed intermediate said drive and clamping units for effecting a cessation of said units upon completion of advance of a workpiece by said drive unit which includes:
      (i) a first disc (27) connected to said drive unit and rotatably mounted on said control shaft (9);
      (ii) a second disc (29) operatively connected to said control shaft (9); and
      (iii) means interconnecting said first and second discs for effecting stoppage of said casing (17) at a point ahead of the limit of travel of said second disc.

2. The improved roller feed device according to claim 1 wherein said interconnecting means includes a roller (35) and a helical spring (32) for moving said roller (35) into wedging contact with the inner surface of said casing (17).

3. The improved roller feed device according to claim 2 wherein said roller (35) is operatively connected to said second disc (29) by means of a thrust element (33) located adjacent one side of said roller (35) and a rod on the opposite side and with coil springs (36) being interposed between said thrust element (33) and said roller (35) to effect continued movement of said second disc (29) after said roller (35) is moved into wedging contact with said casing (17).

4. The improved roller feed device according to claim 2 wherein said clamping unit includes a clamping sector (23) with a planar surface (37) cooperating with said cylindrical casing (17) to define a slot (26) with a wedging position (38) for the roller (35) that corresponds to the limit of travel of said drive unit (20,22).

5. The improved roller feed device according to claim 4 wherein said wedging position (38) is operatively associated with means for the selective location thereof which includes:
   (a) a cover plate (12) mounted on said control shaft (9) and operatively connected to said clamping sector (23);
   (b) a forked extension (39) extending from said cover plate (12);
   (c) pin means (42) interconnecting said forked extension (39) with an oscillatably driven control arm (8) mounted on said control shaft (9); and,
   (d) control means (14, 15) connected to said cover plate (12) for selectively changing the amplitude of oscillations of said control arm (8) and the location of said wedging position (38).

6. The improved roller feed device according to claim 5 wherein said control means includes:
   (a) a selectively rotatable shaft (15);
   (b) an eccentric pin (14) forming one end of said rotatable shaft (15); and,
   (c) means integral with said cover plate (12) defining a bifurcated lower end (13) within which said eccentric pin (14) is disposed.

* * * * *